(12) United States Patent
Zheng et al.

(10) Patent No.: US 8,475,218 B2
(45) Date of Patent: Jul. 2, 2013

(54) SINKING ELECTRICAL CONNECTOR WITH AN IMPROVED MOUNTING MEMBER

(75) Inventors: Qi-Sheng Zheng, Kunshan (CN); Li-Jiang Wang, Kunshan (CN); Guang-Qian Chen, Kunshan (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 38 days.

(21) Appl. No.: 13/314,211

(22) Filed: Dec. 8, 2011

(65) Prior Publication Data
US 2012/0149244 A1 Jun. 14, 2012

(51) Int. Cl.
*H01R 24/00* (2011.01)

(52) U.S. Cl.
USPC ............................................. 439/660

(58) Field of Classification Search
USPC ............... 439/660, 658, 79, 924.1, 607.01, 439/217–218, 607.41; 385/75–76, 83–89, 385/59
See application file for complete search history.

(56) References Cited

U.S. PATENT DOCUMENTS

| 6,475,033 | B1 * | 11/2002 | Zhu et al. ............... 439/607.4 |
| 7,699,663 | B1 * | 4/2010 | Little et al. ................. 439/660 |
| 7,883,371 | B1 * | 2/2011 | Chen et al. ............ 439/607.41 |
| 2002/0002003 | A1 * | 1/2002 | Yamaguchi ............... 439/607 |
| 2009/0264019 | A1 * | 10/2009 | Sakamoto ................. 439/658 |
| 2009/0269983 | A1 | 10/2009 | Tseng |
| 2010/0254662 | A1 * | 10/2010 | He et al. ..................... 385/75 |
| 2010/0303421 | A1 | 12/2010 | He et al. |
| 2010/0322566 | A1 * | 12/2010 | Zheng et al. ................. 385/74 |
| 2010/0322570 | A1 * | 12/2010 | Zheng et al. ................. 385/93 |

* cited by examiner

*Primary Examiner* — Jean F Duverne
(74) *Attorney, Agent, or Firm* — Wei Te Chung; Ming Chieh Chang

(57) ABSTRACT

A sinking electrical connector defines a receiving space for receiving a corresponding plug and includes an insulative housing, a plurality of contacts retained on the housing, and a metal shell covering the housing. The shell includes a top wall, a bottom wall opposite to the top wall, a pair of side walls, and at least one mounting member. The mounting member has a first extending plate extending laterally from the side wall, a second extending plate extending backwardly from the first extending plate, a third extending plate extending inwardly toward the side wall from the second plate, and a mounting tail extending downwardly from the second extending plate to be mounted onto a printed circuit board.

15 Claims, 5 Drawing Sheets

SINKING ELECTRICAL CONNECTOR WITH AN IMPROVED MOUNTING MEMBER

BACKGROUND OF THE INVENTION

1. Field of the Invention

The present invention relates to sinking electrical connectors, more particularly to a sinking electrical connector with an improved mounting member for being mounted onto a printed circuit board reliably.

2. Description of Related Art

Electrical connector usually has an insulative housing, a plurality of contacts, and a metallic shell covering the housing. The shell has a plurality of mounting legs for mounting the electrical connector onto a printed circuit board. An Us patent application publication number 2009269983 discloses an electrical connector having a metallic shell. The shell includes a top wall, a bottom wall, a pair of side walls, and a pair of mounting plates respectively extending outwardly from front edges of the side walls. Each of the mounting plates has a first extending plate laterally extending from the front edge of the side wall, a second extending plate backwardly extending from the first extending plate and being parallel to the side wall, and a mounting tail downwardly protruding from the second extending plate. The first extending plate is perpendicular to the side wall. The mounting tail is adapted for being inserted into an aperture of a printed circuit board while the electrical connector is mounted on the printed circuit board. However, the second extending plate is easily deflected while the electrical connector being under a deflect force or be shaken in a right-to-left direction. Thus, the mounting tail will be coming loose or move away from the printed circuit board as that the electrical connector can not be retained on the printed circuit board stably.

Hence, an improved electrical connector is desired to overcome the above problems.

BRIEF SUMMARY OF THE INVENTION

According to one aspect of the present invention, a sinking electrical connector adapted for being mounted on a printed circuit board (PCB), comprises: a receiving space for receiving a corresponding plug; an insulative housing; a plurality of contacts retained on the housing and each having a contact portion extending into the receiving space, and a tail portion extending out of the housing; and a metal shell covering the housing to define the receiving space together with the housing, and including a top wall, a bottom wall opposite to the top wall, a pair of side walls connecting with the top wall and the bottom wall, and at least one mounting member; wherein the at least one mounting member has a first extending plate extending laterally from the side wall, a second extending plate extending backwardly from the first extending plate, a third extending plate extending inwardly toward the side wall from the second plate, and a mounting tail extending downwardly from the second extending plate for being mounted onto the PCB.

According to another aspect of the present invention, an electrical connector for use with a printed circuit board (PCB), comprises: an insulative housing receiving a plurality of contacts therein; and a metal shell enclosing the housing and including a top wall, a bottom wall opposite to the top wall, a pair of side walls bent from the top wall to the bottom wall, and a pair of mounting members located on two lateral sides thereof; wherein each of the mounting members has a first extending plate laterally extending from a front edge of the side wall, a second extending plate backwardly bent from the first extending plate, a third extending plate inwardly bent toward the side wall from the second extending plate, and a mounting tail downwardly therefrom for being mounted into a mounting hole of the PCB, the second extending plate is spaced away from the side wall to substantially be parallel to the side wall.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
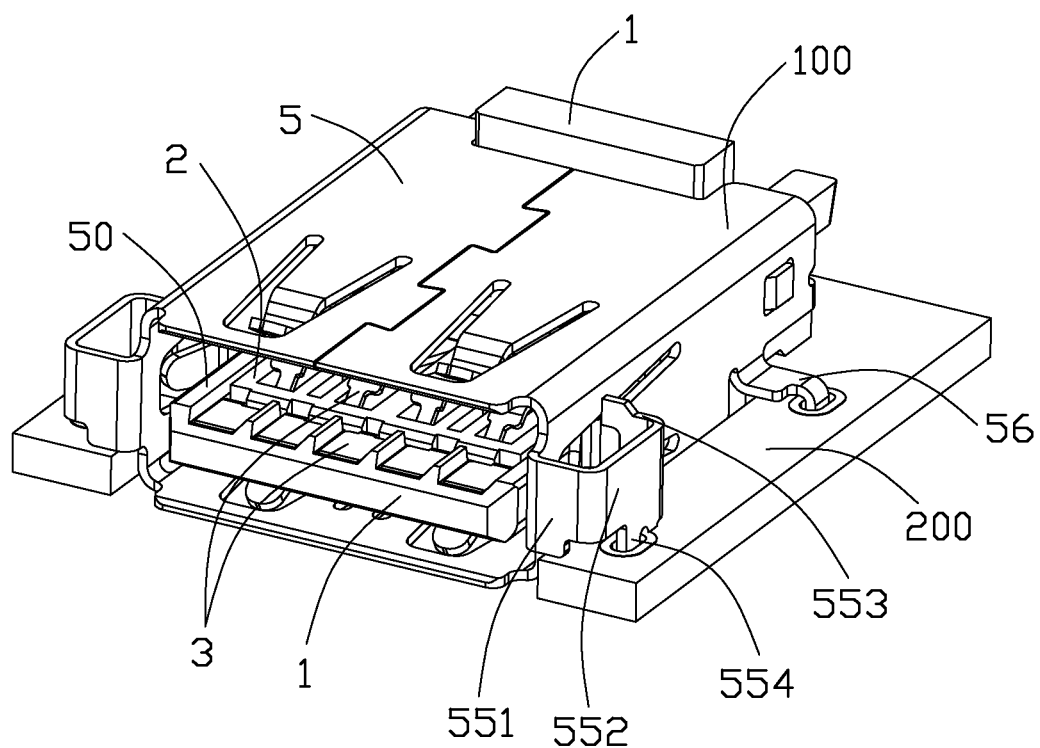
FIG. 1 is a perspective front view of a sinking electrical connector mounted on a printed circuit board in accordance with the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Reference will be made to the drawing figures to describe the present invention in detail, wherein depicted elements are not necessarily shown to scale and wherein like or similar elements are designated by same or similar reference numeral through the several views and same or similar terminology.

Figure 2:
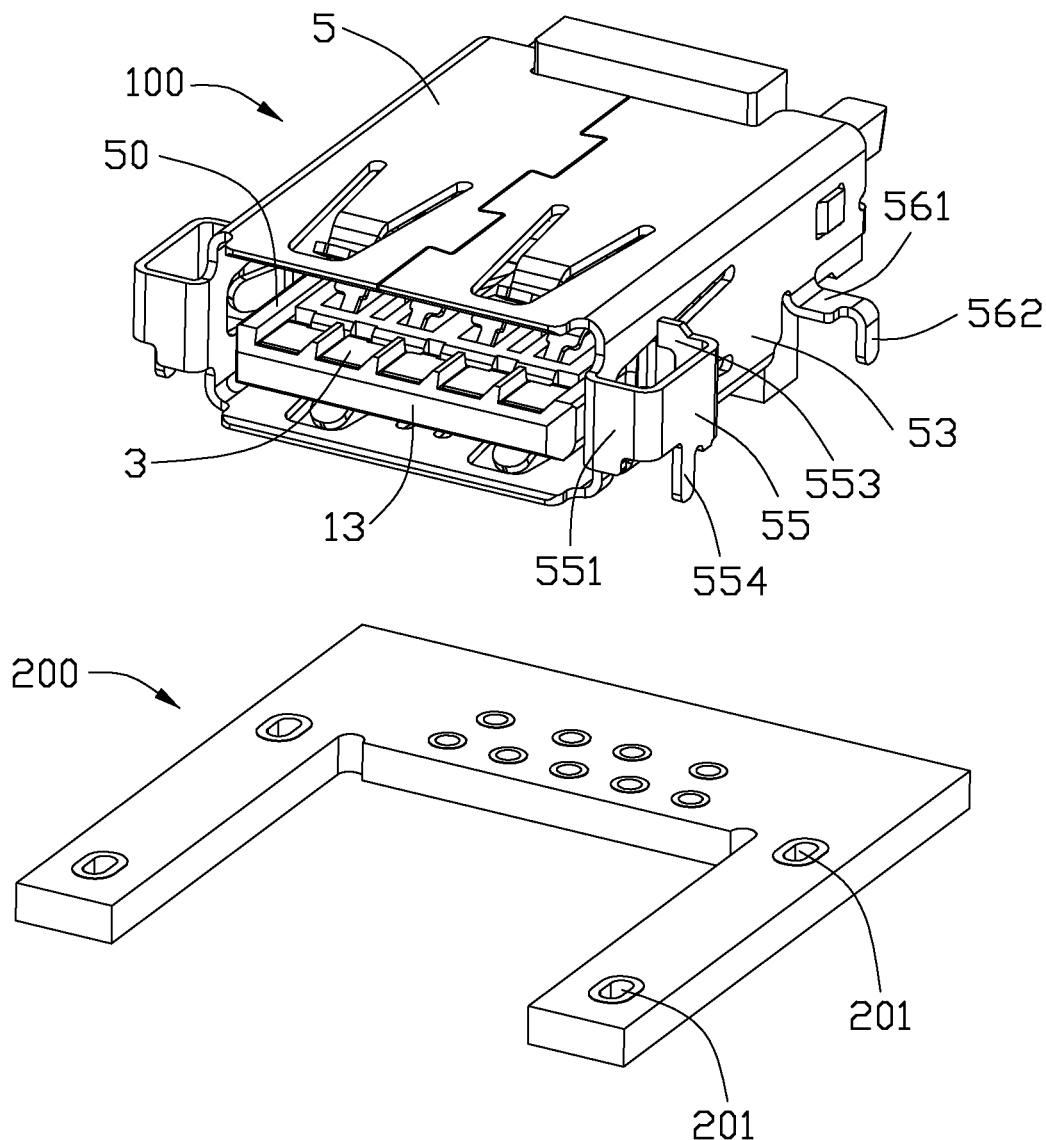
FIG. 2 is a perspective front view of the sinking electrical connector separated from the printed circuit board.
Figure 3:
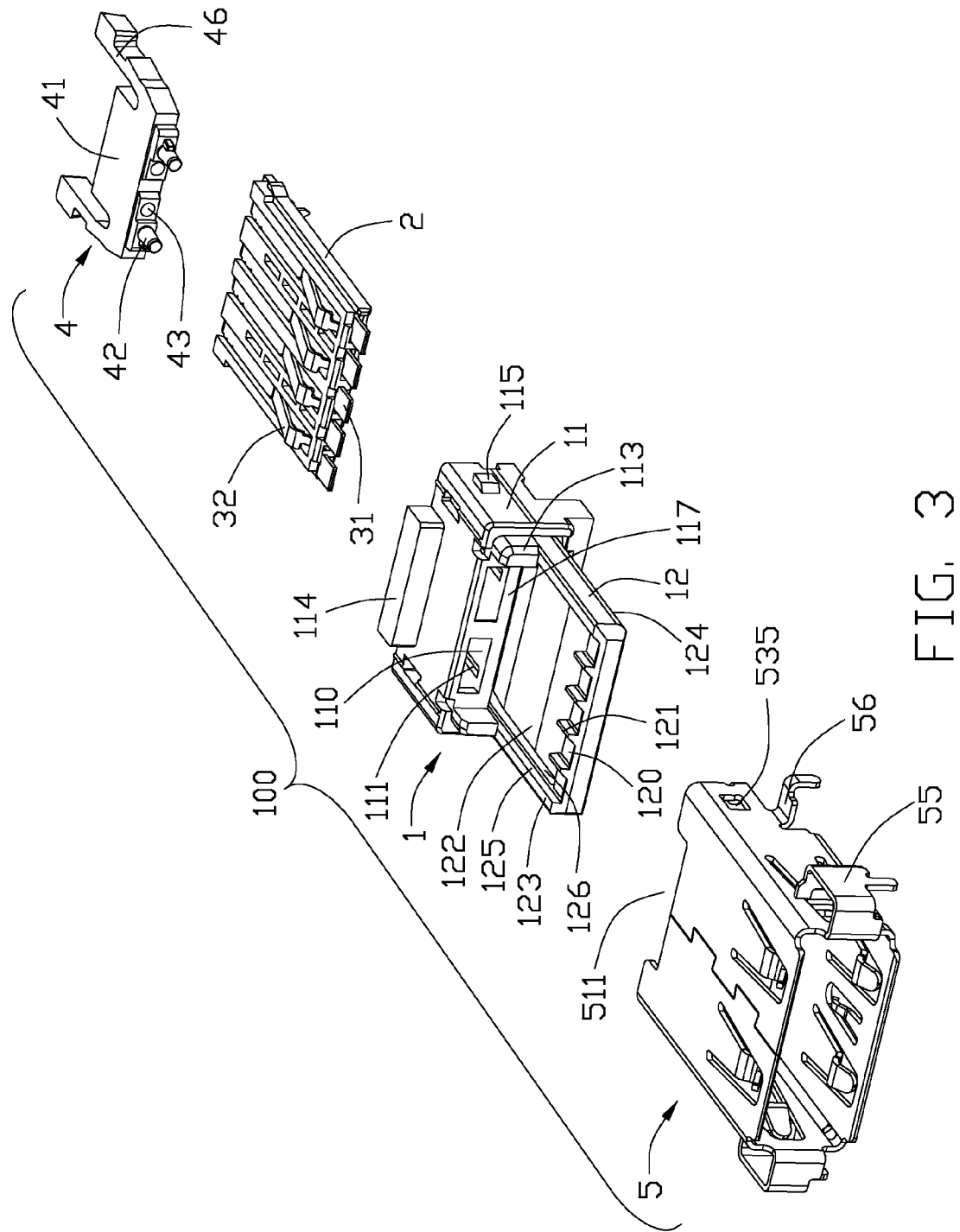
FIG. 3 is partially exploded view of the sinking electrical connector.

Referring to FIGS. 1-3, a sinking electrical connector 100 for being soldered onto a printed circuit board 200 according to the present invention is disclosed. The sinking electrical connector 100 can mate with an optical plug, a standard USB 2.0 plug or a standard USB 3.0 plug (not shown). The sinking electrical connector 100 comprises a first housing 1, a second housing 2 retained in the first housing 1, a plurality of contacts 3 retained on the second housing 2, an optical module 4 retained in the first housing 1, and a metal shell 5 covering the first housing 1.

Figure 4:
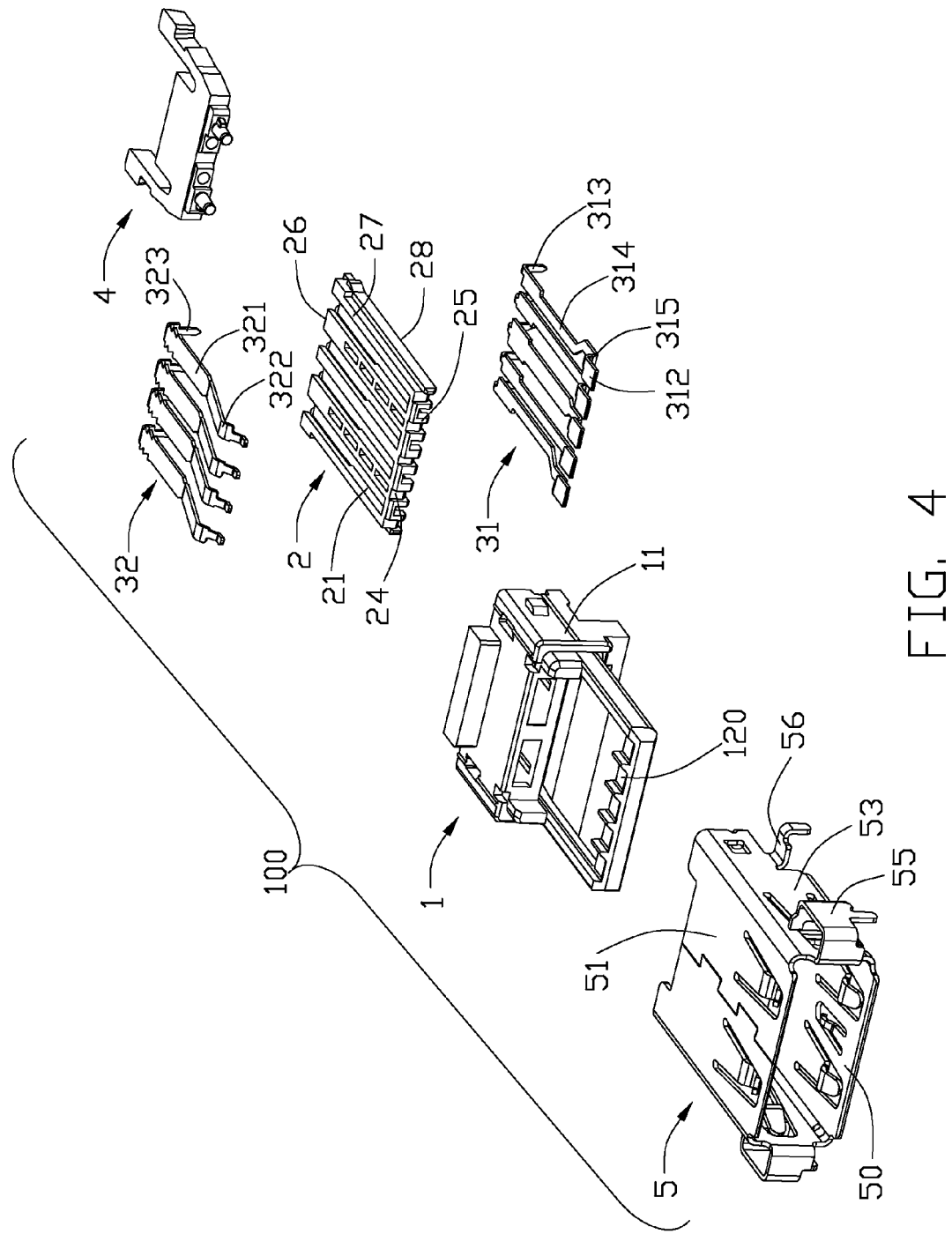
FIG. 4 is an exploded view of the sinking electrical connector.
Figure 5:
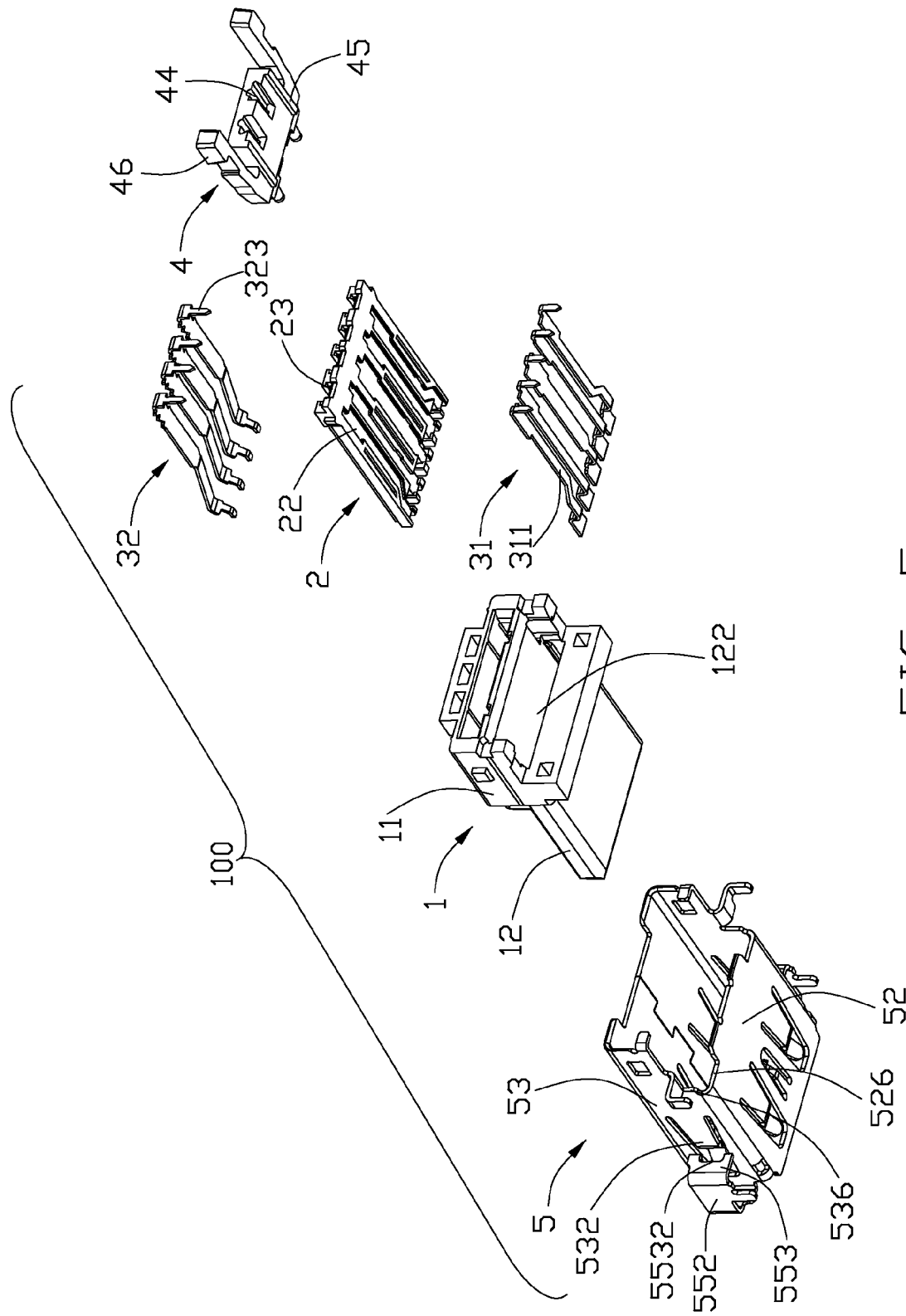
FIG. 5 is a view similar to FIG. 4, while taken from a different aspect.

Referring to FIGS. 3-5, the first housing 1 has a first base 11, and a first tongue 12 protruding forwardly from a middle side of the first base 11. The first base 11 defines a retaining room 110 passing therethrough in a front-to-back direction to retain the optical module 4 therein and located above the first tongue 12. A bottom inner wall of the retaining room 110 defines a pair of guiding slots 111 extending in the front-to-back direction for guiding the optical module 4 to be forwardly retained into the retaining room 110. The first base 11 further has a pair of stopper blocks 113 forwardly protruding two opposited sides thereof for preventing the standard USB 2.0 plug and the standard USB 3.0 plug from continuously moving inwardly and hitting the optical module 4. The stopping blocks 113 also connect two sides of the first tongue 12 at a bottom thereof and are shorter than the first tongue 12 in the front-to-back direction. The first base 11 includes a projection 114 projecting upwardly from a rear end thereof, and a pair of protrusions 114 protruding outwardly to lock with the metal shell 5.

The first tongue 12 has a first upper surface 123, and a first bottom surface 124. A plurality of recesses 120 are recessed from a front edge of the first upper surface 123 and extend forwardly through a front end of the first tongue 12. The first tongue 12 is formed with a plurality of ribs 121 between adjacent two recesses 120 and a cavity 122 behind the recesses 120. The ribs 121 have a top surface which is coplanar with the first upper surface 123 of the first tongue 12. The cavity 122 communicates with the recesses 120 along the front-to-back direction, and defines a lower inner wall which is lower than that of the recesses 120 along an upper-to lower direction. The cavity 122 backwardly extends through the first base 12 to be under the retaining room 110. The first tongue 12 is formed with a pair of resisting walls 125 extending inwardly toward the cavity 122 to form a pair of accumbent U-shape grooves 126 at two sides of the cavity 122. The resisting walls 125 are located behind the recesses 120 and defines a length which is equal to that of the cavity 122 along the front-to-back direction. The first base 11 is formed with a partition board 117 extending horizontally between the retaining room 110 and the cavity 122 to separate the retaining room 110 and the cavity 122 from each other along the upper-to-lower direction.

The second housing 2 substantially presents as planar shaped and is forwardly assembled into the cavity 122 of the first housing 1 to joint with the first tongue 12 to form an integral tongue 13 of the sinking electrical connector 100. The integral tongue 13 defines a volume which is same to that of the first tongue 12. The second housing 2 has a front wall 25, a rear wall 26, a second upper surface 27, and a second bottom surface 28. The second housing 2 defines a plurality of first grooves 21 downwardly recessed from the second upper surface 27 and a plurality of second grooves 22 upwardly recessed from the second bottom surface 28. The first grooves 21 backwardly extend through the second housing 2 but not forwardly extend through the second housing 2. The second grooves 22 forwardly extend through the second housing 2 but not backwardly extend the second housing 2. The rear wall 26 defines a plurality of first indentations 23 aligned with the first grooves 21 and communicating with the first grooves 21. The front wall 25 defines a plurality of second indentations 24 aligned with the second grooves 22 and communicating with the second grooves 22.

The contacts 3 comprise a plurality of first contacts 31 retained on a lower side of the second housing 2 and a plurality of second contacts 32 retained on an upper side of the second housing 2. All the first and second contacts 31, 32 are formed as USB 3.0 contacts which can mate with the standard USB 3.0 plug to transmit USB 3.0 signals. The second contacts 32 are USB 2.0 contacts which can mate with the standard USB 2.0 plug to transmit USB 2.0 signals. Each of the first contacts 31 has a L-shaped first securing portion 311, a flat first contact portion 312 extending forwardly from the first securing portion 311, and a first tail portion 313 extending downwardly out of the second housing 2 from a rear end of the first securing portion 311 to connect with the printed circuit board 200. The first securing portion 311 has a first level portion 314 extending horizontally and a first vertical portion 315 extending vertically to connect the first contact portion 312. The first level portions 314 are retained in the second grooves 22. The first vertical portions 312 are retained in the second indentations 24 and sandwiched between a front inner wall of the cavity 122 and the front end of the first tongue 12. The first contact portions 312 extend beyond a front end of the second housing 2 to be received in the recesses 120 of the first tongue 12.

Each of the second contacts 32 has a second securing portion 321 retained in the first groove 21 of the second housing 2, an elastic second contact portion 322 extending forwardly and upwardly from the second securing portion 321, and a second tail portion 323 extending downwardly out of the second housing 2 from a rear end of the second securing portion 321 to connect the printed circuit board. The second tail portion 323 has an upper end retained in the first indentations 23 and are arranged in one row along a transverse direction perpendicular to the front-to-lower direction. The first tail portions 313 of the first contacts 31 are arranged in another row in the transverse direction and disposed in a front of the second tail portions 323. The second contact portions 322 are cantileveredly received in a front side of the first grooves 21 and protrude out of the second upper surface 27. An arrangement of all the first and second contact portions 312, 322 on the integral tongue 13 is compatible to a standard USB 3.0 receptacle (not shown).

The optical module 4 is retained in the retaining room 110 of the first housing 1 and has a body portion 41, a pair of mating posts 42 extending forwardly beyond the first base 11 of the first housing 1 from the body portion 41 for mating with a pair of holes of the optical plug, and a pair of lenses 43 between the mating posts 42. The body portion 41 defines two pairs of receiving holes 44 for receiving a pair of fibers (not shown) engaging with the lenses 43 to transmit optical signals, thereby the sinking electrical connector 100 would have a high signal transmission speed. The body portion 41 has a pair of guiding blocks 45 at a lower side thereof to engage with the guiding slots 111 of the first housing 1, and a pair of flexible arms 46 at two sides thereof to locking with inner walls of the retaining room 110 so that the optical module 4 would be retained in the retaining room 110 reliably.

The metal shell 5 covers the first and second housings 1, 2 and forms a receiving space 50 for receiving the optical plug, the standard USB 2.0 plug and the standard USB 3.0 plug. The integral tongue 13, the stopping blocks 113 and the mating posts 42 of the optical module 4 forwardly protrude into the receiving space 50, respectively. The lenses 43 are exposed to the receiving space 50 for mating with the optical plug. The metal shell 5 includes a top wall 51, a bottom wall 52, and a pair of side walls 53. The top wall 51 has an apertures 511 at a rear end thereof to engage with the projections 114 of the first housing 1 for preventing the metal shell 5 from moving backwardly. Each of the side walls 53 defines an opening 535 at a rear side thereof, and a spring finger 532 extending into the receiving space 50 for abutting against the plugs. The protrusions 115 of the first housing 1 are melted into the openings 535 via a high heat. Therefore, there is not any slits between the protrusions 115 and openings 535, then the first housing 1 can be closely positioned in the metal shell 5.

The metal shell 5 further has a pair of mounting members 55 outwardly bent from front edges of the side walls 53, and a pair of positioning plates 56 outwardly extending from a rear bottom edge of the side walls 53 and disposed behind the mounting members 55. Each of the mounting members 55 includes a first extending plate 551 extending from the front edge of the side wall 53 in the transverse direction, a second extending plate 552 backwardly extending from the first extending plate 551 and parallel to the side wall 53, a third extending plate 553 extending from the second extending plate 552 toward the side wall 53, and a mounting tail 554 downwardly extending from the second extending plate 552. The first and the third extending plate 551, 553 are both perpendicular to the side wall 53, thus, the whole mounting member 55 substantially forms an U-shaped structure viewed from a top side. The third extending plate 553 is positioned at outside of the spring finger 532 and defines a cutout 5532 formed at an inner end thereof for receiving the spring finger 532 while the spring finger 532 deflecting outwardly.

The positioning plate 56 includes a horizontal portion 561, and a positioning tail 562 bent downwardly from the horizontal portion 561 and aligned with the mounting tail 554 in the front-to-back direction. The bottom wall 52 and the side wall 53 have openings 526, 536 as for forming the positioning plate 56. The mounting tail 554 and the positioning tail 562 are adapted for being soldered into corresponding mounting hole 201 of the printed circuit board 200. The horizontal portion 561 is located above the printed circuit board 200 to define a distance of 0.1 mm therebetween for the positioning tail 562 would adhere much soldering tin.

In assembly, firstly, assembling the optical module 4 into the first housing 1; secondly, assembling the contacts 3 on the second housing 2 respectively; thirdly, assembling the second housing 2 into the first housing 1; finally, enclosing the first and second housing 1, 2 by the metal shell 6.

After the sinking electrical connector 100 is mounted on the printed circuit board 200, the first base 11 of the first housing 1, the first, the second and the third extending plate 551, 552, 553 are directly supported by the printed circuit board 200 to prevent the sinking electrical connector 100 from moving downwardly. The third extending plate 553 would inwardly press on the side wall 53 of the metal shell 5 while the sinking electrical connect 100 due to be under a deflect force or shaken in the transverse direction to prevent over movement of the sinking electrical connector 100. Thus, the sinking electrical connector 100 would be mounted on the printed circuit board 200 reliably.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A sinking electrical connector adapted for being mounted on a printed circuit board (PCB), comprising:
    a receiving space for receiving a corresponding plug;
    an insulative housing;
    a plurality of contacts retained on the housing and each having a contact portion extending into the receiving space, and a tail portion extending out of the housing; and
    a metal shell covering the housing to define the receiving space together with the housing, and including a top wall, a bottom wall opposite to the top wall, a pair of side walls connecting with the top wall and the bottom wall, and at least one mounting member; wherein
    the at least one mounting member has a first extending plate extending laterally from the side wall, a second extending plate extending backwardly from the first extending plate, a third extending plate extending inwardly toward the side wall from the second plate, and a mounting tail extending downwardly from the second extending plate for being mounted onto the PCB.

2. The sinking electrical connector as claimed in claim 1, wherein the receiving space is enclosed by the top wall, the bottom wall, and the side wall, the first extending plate extends from a front edge of the side wall, the third extending plate has an inner end adjacent to or pressing onto the side wall; an optical module retained in the housing and having at least one lens exposed to the receiving space, the housing defines a pair of stopping blocks forwardly protruding beyond the lens preventing an uncorresponding plug from continuously moving inwardly and hitting the lens, the stopping blocks upwardly protrude from two sides of the first tongue and are shorter than the first tongue in the front-to-back direction, the lens are disposed between the pair of stopping blocks in the transverse direction.

3. The sinking electrical connector as claimed in claim 1, wherein the side wall has a spring finger extending into the receiving space for engaging with the corresponding plug and opposited to the third extending plate in a transverse direction.

4. The sinking electrical connector as claimed in claim 3, wherein the third extending plate defines a cutout formed at the inner end thereof for receiving the spring finger while the spring finger deflecting outwardly.

5. The sinking electrical connector as claimed in claim 1, wherein the mounting member substantially forms an U-shaped structure viewed from a top side, the first and the third extending plates are perpendicular to the side wall, the second extending plate is parallel to the side wall, at least one of the extending plates is upwardly supported by the PCB.

6. The sinking electrical connector as claimed in claim 1, wherein the metal shell further includes a horizontal portion, and a positioning tail bent downwardly from the horizontal portion for being mounted into a mounting hole of the PCB, the positioning tail is aligned with the mounting tail in a front-to-back direction.

7. The sinking electrical connector as claimed in claim 1, wherein the housing includes a first housing having a first base and a first tongue forwardly extending from the first base, the first tongue has a cavity recessed on an upper surface thereof and backwardly extending through the first base, the second housing is retained in the cavity to joint with the first tongue for forming an integral tongue located in the receiving space, the contact portions are located on the integral tongue.

8. The sinking electrical connector as claimed in claim 1, wherein the contacts are formed as USB 3.0 contacts which can mate with the standard USB 3.0 plug to transmit USB 3.0 signals, the metal shell has a pair of the mounting members located on two lateral sides of the receiving space, the first, the second, and the third extending plates are disposed above the bottom wall in an upper-to-lower direction.

9. An electrical connector for use with a printed circuit board (PCB), comprising:
    an insulative housing receiving a plurality of contacts therein; and
    a metal shell enclosing the housing and including a top wall, a bottom wall opposite to the top wall, a pair of side walls bent from the top wall to the bottom wall, and a pair of mounting members located on two lateral sides thereof; wherein each of the mounting members has a first extending plate laterally extending from a front edge of the side wall, a second extending plate backwardly bent from the first extending plate, a third extending plate inwardly bent toward the side wall from the second extending plate, and a mounting tail downwardly therefrom for being mounted into a mounting hole of the PCB, the second extending plate is spaced away from the side wall to substantially be parallel to the side wall; wherein at least one of the first, the second and the third extending plates is downwardly supported on the PCB, the first, the second and the third extending plates are located above the bottom wall in an upper-to-lower direction; wherein the mounting tail extends downwardly from the second extending plate and is coplanar with the second extending plate in a vertical plane; wherein the metal shell further includes a horizontal portion, and a positioning tail bent downwardly from the horizontal portion for being mounted into another mounting hole of the PCB, the positioning tail is aligned with the mounting tail in a front-to-back direction.

10. An electrical connector comprising:
an insulative housing;
a plurality of contacts disposed in the housing;
a metallic shell enclosing the housing to commonly define a mating port, said metallic shell including opposite upper and bottom side walls with two opposite lateral side walls linked by two sides thereof so as to form a front opening to communicate the mating port with an exterior in a front-to-back direction;
a plurality of resilient tangs unitarily stamped and extending from the corresponding side walls of the metallic shell into the mating port;
a pair of front mounting members unitarily extending from the shell around the front opening, respectively, each of said front mounting members defining a main plate equipped with a downwardly extending mounting post in a vertical direction perpendicular to said front-to-back direction, and spaced, in a transverse direction perpendicular to said front-to-back direction and said vertical direction, from the adjacent lateral side wall so as to form a transverse space to forgive outward deflection of the resilient tang on said corresponding lateral side wall;
a pair of rear mounting members having thereof main plates each equipped with a downwardly extending mounting post, wherein the main plate of the front mounting member is connected to the corresponding lateral side wall via a vertical plate extending from a front edge of the corresponding lateral side wall while the main plate of the rear mounting member is connected to the corresponding lateral side wall via a horizontal plate extend from a bottom edge of the corresponding lateral side wall.

11. The electrical connector as claimed in claim 10, wherein the mounting member unitarily extends from a front edge of the corresponding lateral side wall.

12. The electrical connector as claimed in claim 10, wherein said main plate is supported by two opposite lateral plates for spacing the main plate from the corresponding lateral side wall.

13. The electrical connector as claimed in claim 12, wherein said two opposite lateral plates are spaced from each other in the transverse direction.

14. The electrical connector as claimed in claim 10, wherein said main plate defines a shoulder above the bottom side wall for abutment with a printed circuit board on which the connector is seated.

15. The electrical connector as claimed in claim 12, wherein the upper side wall defines a seam along a center line while the bottom side wall defines a smaller resilient tang in aligned with said seam in the vertical direction.

* * * * *